United States Patent
Haskara et al.

(10) Patent No.: US 11,760,155 B2
(45) Date of Patent: Sep. 19, 2023

(54) ENERGY MANAGEMENT SYSTEM FOR AN ELECTRIC VEHICLE

(71) Applicant: GM Global Technology Operations LLC, Detroit, MI (US)

(72) Inventors: Ibrahim Haskara, Macomb, MI (US); Bharatkumar Hegde, Bloomfield Hills, MI (US); Chen-Fang Chang, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 387 days.

(21) Appl. No.: 17/224,392

(22) Filed: Apr. 7, 2021

(65) Prior Publication Data

US 2022/0332165 A1 Oct. 20, 2022

(51) Int. Cl.
*B60H 1/00* (2006.01)
*B60W 10/08* (2006.01)

(52) U.S. Cl.
CPC ..... *B60H 1/00392* (2013.01); *B60H 1/00735* (2013.01); *B60W 10/08* (2013.01); *B60W 2520/105* (2013.01)

(58) Field of Classification Search
CPC ............ B60H 1/00392; B60H 1/00735; B60H 1/0073; B60H 1/00764; B60H 1/00385; B60H 1/00642; B60W 10/08; B60W 2520/105; B60L 58/16; B60L 1/00
See application file for complete search history.

(56) References Cited

U.S. PATENT DOCUMENTS

| | | | |
|---|---|---|---|
| 2001/0039230 A1* | 11/2001 | Severinsky | B60W 20/30 180/65.23 |
| 2009/0095549 A1* | 4/2009 | Dalum | B60L 1/00 180/65.265 |
| 2012/0158227 A1* | 6/2012 | Tate, Jr. | B60W 10/26 701/22 |
| 2012/0207620 A1* | 8/2012 | Dalum | B60W 20/40 903/903 |
| 2013/0221928 A1* | 8/2013 | Kelty | B60L 58/24 320/134 |
| 2013/0269921 A1* | 10/2013 | Kusumi | B60H 1/00764 165/42 |

* cited by examiner

*Primary Examiner* — Richard M Camby
(74) *Attorney, Agent, or Firm* — Vivacqua Crane PLLC

(57) ABSTRACT

A computer for an energy management system of an electric vehicle includes a processor. The computer further includes a memory including instructions such that the processor is programmed to determine a value function V based on a plurality of actions U in a plurality of states S. The processor is further programmed to select an action associated with a highest reward value at a current state S. The action U is an HVAC subsystem variable. The state S is a traction power drawn from a rechargeable energy storage system (RESS) to operate a traction subsystem, a base power input drawn from the RESS to operate an HVAC subsystem, a nominal reference cabin heat input set-point determined by the local HVAC processor, an acceleration of the electric vehicle, a current vehicle speed, an average vehicle speed, and a calibrated average vehicle speed estimate.

20 Claims, 3 Drawing Sheets

ENERGY MANAGEMENT SYSTEM FOR AN ELECTRIC VEHICLE

INTRODUCTION

The present disclosure relates to a vehicle electrical system, and more particularly to an energy management system for an electric vehicle (EV) that coordinates multiple loads to improve battery life and increase EV range while meeting driver traction demand and cabin comfort.

Current EV operating strategies do not coordinate multiple load requesters (traction, HVAC, thermal etc.) to manage their combined impact on battery usage and long-term battery health. Because multiple loads can draw power from the battery at the same time, the battery usage current can spike, which can increase battery aging. In addition, current strategies can provide power to loads without regard to the efficiency cycle of the loads. In this way, when producing a constant output at different states, a load operating an efficiency below an average efficiency can consume more electrical energy than the same load operating an efficiency above the average efficiency.

Thus, while existing vehicle electrical systems achieve their intended purpose, there is a need for a new and improved energy management system that addresses these issues.

SUMMARY

According to several aspects of the present disclosure, a computer for an energy management system of an electric vehicle is provided. The supervisory computer includes a supervisory processor and a supervisory memory. The supervisory memory includes instructions such that the supervisory processor is programmed to determine a value function V based on a plurality of actions U in a plurality of states S. The supervisory processor is further programmed to select an action U associated with a highest reward value at a state V corresponding to the value function V. The action U is an HVAC subsystem variable. The states S include at least one of a traction power drawn from a rechargeable energy storage system (RESS) to operate a traction subsystem, a base power input drawn from the RESS to operate an HVAC subsystem, a nominal reference cabin heat input set-point determined by the local HVAC processor, an acceleration of the electric vehicle, a current vehicle speed, an average vehicle speed, and a calibrated average vehicle speed estimate.

In one aspect, the supervisory processor is further programmed to calculate a current reward value based on a change of a battery capacity loss or a cabin comfort.

In another aspect, the average vehicle speed is based on V2V data or V2X data.

In another aspect, the calibrated average vehicle speed estimate is based on a past statistic for the electric vehicle or a speed limit.

In another aspect, the supervisory processor is further programmed to actuate an agent based on the selected action.

In another aspect, the agent comprises the HVAC subsystem.

In another aspect, the supervisory processor is further programmed to receive the state S from a traction subsystem of the electric vehicle.

According to several aspects of the present disclosure, an energy management system for an electric vehicle is provided. The system includes a rechargeable energy storage system (RESS) and an HVAC subsystem. The HVAC subsystem includes a local HVAC processor and at least one HVAC memory. The HVAC memory includes instructions executable by the local HVAC processor, such that the local HVAC processor is programmed to generate a nominal signal associated with a request for a base power input from the RESS. The HVAC subsystem further includes an HVAC actuator capable of generating a target output over a predetermined period of time, in response to the HVAC actuator receiving the base power input from the RESS. The system further includes a traction subsystem including a local traction processor. The traction subsystem further includes at least one traction memory storing instructions executable by the local traction processor, such that the local traction processor is programmed to generate a traction signal associated with a request for a traction power drawn from the RESS. The system further includes a supervisory computer including a supervisory processor. The supervisory computer further includes a supervisory memory including instructions such that the supervisory processor is programmed to determine a value function V based on a plurality of actions U in a plurality of states S. The supervisory processor is further programmed to select an action associated with a highest reward value at a state V corresponding to the value function V. The value function V is an adjusted power input set-point for the HVAC subsystem. The action U is an HVAC subsystem variable. The state S includes at least one of the traction power to operate the traction subsystem, the base power input to operate the HVAC subsystem, a nominal reference cabin heat input set-point determined by the local HVAC processor, an acceleration of the electric vehicle, a current vehicle speed, an average vehicle speed, and a calibrated average vehicle speed estimate.

In one aspect, the HVAC actuator is configured to actuate an HVAC component that is configured to operate at a first efficiency to generate a first output, in response to the electric vehicle being disposed in a first state and the HVAC component receiving a first power input from the RESS. The HVAC component is further configured to operate at a second efficiency to generate a second output, in response to the electric vehicle being disposed in a second state and the HVAC component receiving a second power input from the RESS. The HVAC component is further configured to generate the target output, in response to the HVAC component receiving a modulation between the first and second power inputs over the predetermined period of time. The second efficiency is above the first efficiency such that the electrical power associated with the modulation between the first and second power inputs over the predetermined period of time is below the electrical power associated with the base power input over the predetermined period of time.

In another aspect, the supervisory processor selecting the action associated with the highest reward value comprises the supervisory processor generating a modulated power signal, in response to the supervisory processor receiving the nominal signal from the local HVAC processor. The local HVAC processor modulates between the first and second power inputs, in response to the local HVAC processor receiving the modulated signal from the supervisory processor.

In another aspect, the supervisory processor does not control the traction subsystem.

In another aspect, the processor is further programmed to calculate a current reward value R based on a change of a battery capacity loss or a cabin comfort.

In another aspect, the average vehicle speed is based on V2V data or V2X data.

In another aspect, the calibrated average vehicle speed estimate is based on a past statistic for the electric vehicle or a speed limit.

In another aspect, the processor is further programmed to actuate an agent based on the selected action.

In another aspect, the agent comprises the HVAC subsystem.

In another aspect, the supervisory processor is further programmed to receive the state S from a traction subsystem of the electric vehicle.

According to several aspects of the present disclosure, a method is provided for operating a computer for an energy management system of an electric vehicle. The computer includes a processor and a memory. The method includes determining, using the processor, a value function V based on a plurality of actions U in a plurality of states S. The method further includes selecting, using the processor, an action associated with a highest reward value corresponding to the value function V. The action U is an HVAC subsystem variable. The state S is at least one of a power drawn from a rechargeable energy storage system (RESS) to operate a traction subsystem, a power drawn from the RESS to operate an HVAC subsystem, a current vehicle speed, an acceleration of the electric vehicle, a nominal reference cabin heat input set-point determined by a local HVAC processor, an average vehicle speed, and a calibrated average vehicle speed estimate.

In one aspect, the method further includes calculating, using the processor, a current reward value based on a change of a battery capacity loss or a cabin comfort.

In another aspect, the value function V is calculated based on a change of at least one a battery capacity loss and a cabin comfort according to:

$$U = \pi^*(S) = \underset{u}{\operatorname{argmax}} V^*(S, U)$$

wherein V(S,U) represents a current multidimensional table V(S,U) for control mapping and the current multidimensional table V(S,U) is a value function with the input state S to provide the corresponding action U. In addition, $$\underset{u}{\operatorname{argmax}} V^*(S, U)$$

indicates an operation of selecting the action U associated with the highest reward value R at the state S from the current multidimensional table V(S,U). Furthermore, $\pi^*(S)$ is a policy putting the operation into one representation such that the supervisory processor selects the action U associated with the highest reward value R at the current state S in the current multidimensional table V(S,U) as a final action U. The value function V is further calculated according to:

$$Vnew(S, U) \leftarrow [1 - \alpha]V(S, U) + \alpha\left[R(S, U) + \gamma \underset{U'}{\max} V(S', U')\right]$$

where the current multidimensional table V(S,U) is updated to a new multidimensional table Vnew(S,U). The current multidimensional table V(S,U) is multiplied by [1−α] and added with a term summing a current reward value R and a projected value from the current multidimensional table V(S,U) based on a next action U' at a next state S'. Furthermore, a is s learning rate and y is a discount factor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one example of an energy management system (system) that coordinates multiple loads to realize optimal load delivery for improved EV range and reduced battery stress. Non-limiting examples of these loads include a traction subsystem, an HVAC subsystem, a battery heating and cooling subsystem, an accessory load, and/or other suitable subsystems. The system utilizes a multi-layer control strategy in which a supervisory layer EM processor (supervisory processor) that adjusts or augments local power requests (e.g., by a HVAC processor) based on drive variables and preview information (e.g., integrated traction and HVAC subsystem delivery). The system implements in real-time a feedback reward in the form of, for example, energy consumption, long-term battery health, and cabin comfort. The system supervises individual loads (e.g. HVAC control) to minimize total energy consumption by modulating power delivered to the load requesters based on their efficiency. As described in more detail below, the system implements reinforcement learning with a reward measure to train the system during a design phase and then adapt to variations in real-time during in-field use. In one example, the system serves as a default or selectable customer eco-load management feature (e.g. eco-cooling for HVAC) that leverages drive information (e.g. speed and acceleration) to manage other loads and improve long-term battery state of health (SOH).

Figure 1:
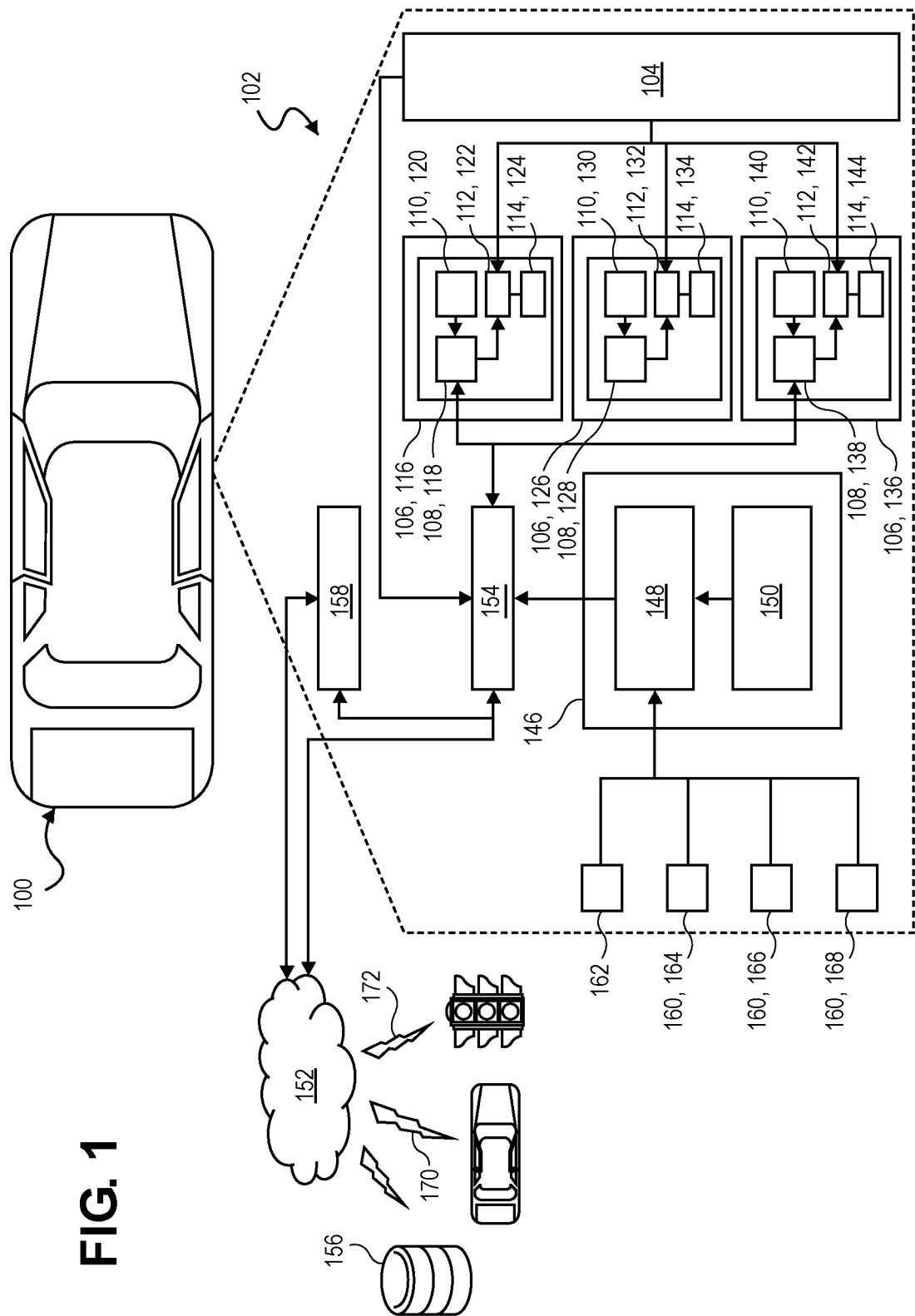
FIG. 1 is a schematic view of one example of an electric vehicle having an energy management system with a computer for coordinating multiple power users to increase battery life and maintain cabin comfort.

Referring to FIG. 1, one example of a motor vehicle 100 includes an energy management system 102 (system). The motor vehicle 100 can be an electric land vehicle, such as a car or a truck. The system 102 includes a rechargeable energy storage system (RESS) 104 and a plurality of loads 106, with each load 106 including a local processor 108 and a local memory 110 for storing instructions executable by the local processor 108 such that the local processor 108 is programmed to generate a nominal signal associated with a request for power from the RESS 104. Each load 106 further includes an actuator 112 capable of actuating various components 114 for generating a target output over a predetermined period of time, in response to the actuator 112 receiving the power from the RESS 104. The actuators 112 are implemented via circuits, chips, motors, or other electronic and or mechanical components that can actuate various vehicle subsystems in accordance with appropriate control signals as is known.

As described in the examples detailed below, each component 114 is one or more hardware components 114 adapted to perform a mechanical or electro-mechanical function, such as adjusting blower temperature or fan speed of an HVAC subsystem. The efficiency of these components 114 depends on the state S of the environment. A component 114 operating in one state S can have an efficiency that is higher than its average efficiency over a period of time, and the same component operating in another state can have an efficiency that is lower than the average efficiency over the same period of time. As described in detail below, the system 102 delivers more power to certain components when they are operating more efficiently to reduce overall power consumption.

One exemplary load is an HVAC subsystem 116 that includes a local HVAC processor 118. The HVAC subsystem 116 further includes at least one HVAC memory 120 including instructions executable by the local HVAC processor 118, such that the local HVAC processor 118 is programmed to generate a nominal signal. The nominal signal is associated with a request for a nominal HVAC power input $P_{HVAC,nom}$ from the RESS 104 to generate a nominal reference cabin heat input $\overline{Q}_{cabin,nom}$ or maintain the cabin at a reference cabin temperature $\overline{T}_{cabin,nom}$. The HVAC subsystem 116 further includes an HVAC actuator 122 that is capable of actuating various HVAC components 124 to generate a target output $\overline{Q}_{cabin,nom}$ or $\overline{T}_{cabin,nom}$ over a predetermined period of time, in response to the HVAC actuator 122 receiving the nominal HVAC power input $P_{HVAC,nom}$ from the RESS 104. Non-limiting examples of HVAC components 124 include an A/C compressor, a radiator, a radiator fan, a condenser, and a blower fan.

The HVAC component 124 is movable to a plurality of states where the HVAC component 124 operates at a corresponding efficiency. The HVAC component 124 is configured to operate at a first efficiency to generate a first output, in response to the vehicle 100 being disposed in a first state. The HVAC actuator 122 is further configured to operate at a second efficiency to generate a second output, in response to the vehicle 100 being disposed in a second state. The vehicle 100 in the first state is travelling at a first vehicle speed, and the vehicle 100 in the second state is travelling at a second vehicle speed that is above the first vehicle speed, such that the second efficiency is higher than the first efficiency and the second output is higher than the first output over an identical period of time. As but one example, because the radiator transfers heat from coolant to the flow of air through the radiator, the efficiency of the HVAC subsystem 116 can be directly proportional to the vehicle speed, e.g. where the vehicle 100 in the first state is the vehicle 100 travelling at a first speed and the vehicle 100 in the second state is the vehicle 100 travelling at a second speed that is above the first speed. As described in detail below, the system 102 can modulate power supplied to the HVAC components between first and second HVAC power inputs over a predetermined period of time, such that the cumulative first and second outputs provide the same target output $\overline{Q}_{cabin,nom}$ or $\overline{T}_{cabin,nom}$ that the HVAC component 124 is capable of providing when delivering a fixed nominal HVAC power input $P_{HVAC,nom}$ to the HVAC components 124 over the same period of time. Furthermore, the cumulative modulated power $P_{HVAC}$ is less than the cumulative fixed nominal HVAC power $P_{HVAC,nom}$ over the same period of time because the first HVAC power input is lower than the nominal HVAC power input $\overline{Q}_{cabin,nom}$ and delivered to the HVAC component 124 when it is operating at the lower first efficiency, and the second HVAC power input is higher than the nominal HVAC power input $\overline{Q}_{cabin,nom}$ and delivered to the HVAC component 124 when it is operating at the higher second efficiency.

Another exemplary load can include a thermal battery cooling and heating subsystem 126 (thermal subsystem) that includes a local thermal processor 128. The thermal subsystem 126 further includes at least one thermal memory 130 including instructions executable by the local thermal processor 128, such that the local thermal processor 128 is programmed to generate a nominal signal. The nominal signal is associated with a request for a nominal thermal power input from the RESS 104. The thermal subsystem 126 further includes a thermal actuator 132 capable of actuating various thermal components for generating a target output over a predetermined period of time, in response to the thermal actuator 132 receiving the nominal thermal power input from the RESS 104. Similar to the HVAC actuator 122, the thermal actuator 132 is configured to generate the associated target output, in response to the thermal actuator 132 receiving a modulation between first and second power inputs over the predetermined period of time. In one example, the thermal actuator 132 is configured to actuate thermal components 134, such as a heat resistive wire or other suitable heating elements and/or a fan. It is contemplated that the loads can include any combination of the HVAC subsystem, the thermal subsystem, or other suitable subsystems.

Still another exemplary load is a traction subsystem 136, which is monitored by the system 102 for coordinating the other loads. The traction subsystem 136 includes a local traction processor 138. The traction subsystem 136 further includes at least one traction memory 140 storing instructions executable by the local traction processor 138, such that the local traction processor 138 is programmed to generate a traction signal. The traction signal is associated with a request for the traction power $P_{trac}$ drawn from the RESS 104. The traction subsystem 136 further includes a traction actuator 142 capable of actuating various thermal components 144, such as a motor drive unit, for generating a target output over a predetermined period of time, in response to the thermal actuator 132 receiving the nominal thermal power input from the RESS 104. The system 102 does not modulate or modify power $P_{trac}$ delivered to the traction subsystem 136 and without sacrificing driver demand.

The system 102 further includes a supervisory computer 146 including a supervisory processor 148 and at least one supervisory memory 150. The supervisory memory 150 includes one or more forms of computer readable media, and stores instructions executable by the supervisory computer 146 for performing various operations, including as disclosed herein. Via a network 152, a vehicle communications module 154 can allow the supervisory computer 146 to communicate with a server 156.

The supervisory processor 148 may be communicatively coupled to, e.g., via the vehicle communications module 154, more than one local processor 108, e.g., included in electronic processor units (ECUs) or the like included in the vehicle 100 for monitoring and/or controlling various vehicle components 114. In this example, the supervisory processor 148 is coupled to the local traction processor 138 to monitor traction variables. Non-limiting examples of the traction variables include current vehicle speed, current vehicle acceleration, and traction power. Furthermore, the supervisory computer 146 may communicate, via the vehicle communications module 154, with a navigation system that uses the Global Position System (GPS) 158. As an example, the supervisory processor 148 may request and receive location data of the vehicle 100, speed limit data, traffic data, road conditions, and the like. The location data may be in a known form, e.g., geo-coordinates (latitudinal and longitudinal coordinates).

The supervisory processor 148 is generally arranged for communications on the vehicle communications module 154 via an internal wired and/or wireless network, e.g., a bus or the like in the vehicle 100, such as a processor area network (CAN) or the like, and/or other wired and/or wireless mechanisms.

Via the vehicle communications module 154, the supervisory processor 148 may transmit messages to various devices in the vehicle 100 and/or receive messages from the various devices, e.g., vehicle sensors 160, actuators 112, vehicle components 114, a human machine interface (HMI) 162, etc. The HMI 162 can be configured to dispose the system 102 in a default or selectable eco-boost mode where the system 102 is activated for coordinating the multiple loads of the vehicle 100. Alternatively or additionally, in cases where the supervisory processor comprises a plurality of devices, the vehicle communications network may be used for communications between devices represented as the supervisory computer 146 in this disclosure. Further, as mentioned below, various processors and/or vehicle sensors 160 may provide data to the supervisory computer 146.

The supervisory processor 148 is programmed to monitor traction states, including current vehicle speed, current vehicle acceleration power, and traction power. In other examples, the supervisory processor 148 is coupled to vehicle sensors 160, which may include a variety of devices to provide data that can represent or influence traction states. Non-limiting examples of the vehicle sensors 160 may include Light Detection and Ranging (lidar) sensor(s) 164, etc., disposed on a top of the vehicle, behind the vehicle front windshield, around the vehicle, etc., that provide relative locations, sizes, and shapes of objects and/or conditions surrounding the vehicle. As another non-limiting example, one or more radar sensors 166 fixed to vehicle bumpers may provide data on range velocity of objects (possibly including second vehicles), etc., relative to the location of the vehicle. The vehicle sensors may further include camera sensor(s) 168, e.g. front view, side view, rear view, etc., providing images from a field of view inside and/or outside the vehicle 100.

In addition, the supervisory processor 148 may be configured for communicating via a vehicle to vehicle communication module 154 or interface 162 with devices outside of the vehicle 100, e.g., through a vehicle-to-vehicle (V2V) communication 170 or a vehicle-to-infrastructure (V2X) wireless communication 172, to (typically via the network 152) a remote server 156. The module 154 could include one or more mechanisms by which the supervisory processor 148 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 154 include cellular, BLUETOOTH, IEEE 802.11, dedicated short range communications (DSRC), and/or wide area networks (WAN), including the Internet, providing data communication services.

The network 152 includes one or more mechanisms by which a supervisory processor 148 may communicate with a server 156. Accordingly, the network 152 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services. The server 156 can be a computing device, i.e., including one or more processors and one or more memories, programmed to provide operations such as disclosed herein. Further, the server 156 can be accessed via the network 152, e.g., the Internet or some other wide area network.

The supervisory processor 148 can receive and analyze data from sensors 160 substantially continuously, periodically, and/or when instructed by a server 156, etc. Further, object classification or identification techniques can be used, e.g., in a supervisory processor 148 based on lidar sensor, camera sensor, etc., data, to identify a type of object, e.g., vehicle, person, rock, pothole, bicycle, motorcycle, etc., as well as physical features of objects, which can cause a driver to adjust drivable variables, such as current vehicle speed, current vehicle acceleration, and traction power.

The supervisory processor 148 is coupled to the local load processors 108 and programmed to determine one or more load variables to adjust or augment for the local load processors to implement and reduce total power drawn from the RESS 104. As described in detail below, the supervisory processor 148 is programmed to interpret desired cabin responses associated with the variables. In one example, the supervisory processor 148 may be programmed to interpret desired cabin responses, such as a nominal reference cabin temperature set-point $\overline{T}_{cabin,nom}$ or a nominal reference cabin heat input set-point $Q_{cabin,nom}$ set by the local HVAC processor 118. The supervisory processor 148 can determine an adjusted cabin temperature set-point $\overline{T}_{cabin}$ for the local HVAC processor 118, which can be defined by Equation 1:

$$\overline{T}_{cabin} = \overline{T}_{cabin,nom} + f_{RL}(\bullet) \qquad \text{Eq. 1}$$

where $f_{RL}(\bullet)$ represents a correction or adjustment by the supervisory processor 148, and $\overline{T}_{cabin}$ represents the adjusted cabin temperature set-point set by the supervisory processor 148.

In another example, the supervisory processor 148 may be programmed to determine an adjusted heat input set-point $\overline{Q}_{cabin}$ for use by the local HVAC processor 118. The adjusted heat input set-point $\overline{Q}_{cabin}$ can be determined by Equations 2 and 3:

$$\overline{Q}_{cabin,nom} = \dot{m}_b c_p (\overline{T}_{cabin} - T_s) \qquad \text{Eq. 2}$$

$$\overline{Q}_{cabin} = \overline{Q}_{cabin,nom} + f_{RL}(\#) \qquad \text{Eq. 3}$$

where $\dot{m}_b$ represents flow to a passenger cabin through a blower, $c_p$ represents a specific heat constant, $\overline{T}_{cabin}$ represents the adjusted cabin temperature set-point, $\overline{Q}_{cabin,nom}$ represents a nominal reference cabin heat input set-point first determined by the local HVAC processor 118, $f_{RL}(\bullet)$ represents a correction or adjustment by the supervisory processor 148, and $\overline{Q}_{cabin}$ represents an adjusted heat input set-point for the local HVAC processor 118. It is contemplated that the supervisory processor can implement other equations to calculate the adjusted cabin temperature set-point $T_{cabin}$, the adjusted heat input set-point $\overline{Q}_{cabin}$, or other HVAC variables.

The supervisory processor 148 is programmed to determine an impact that the current operations have on a battery state of health (SOH), which can be defined by Equations 4, 5, and 6:

$$Q_{loss}(\%) = 100 \frac{Q_{b,nom} - Q_b(Ah)}{Q_{b,nom}} \qquad \text{Eq. 4}$$

$$Q_{loss} = g(T_b, \Delta SoC) \cdot (Ah)^n \qquad \text{Eq. 5}$$

$$\Delta Q_{loss} = \frac{\partial Q_{loss}}{\partial Ah} \cdot \Delta Ah = n \cdot g \cdot Ah^{n-1} \cdot \Delta Ah \qquad \text{Eq. 6}$$

where $Q_{b,nom}$ represents a nominal batter capacity or total charge that a fresh RESS 104 is capable of holding, $Q_b(Ah)$ represents battery capacity at a current time, $Q_{loss}(\%)$ represents a battery capacity loss in percentage, g represents a regression or function with its inputs in that formula (calibrated during a design or training phase), $T_b$ represents a battery temperature, $\Delta SoC$ represents a change in a State of Charge of the battery, $(Ah)^n$ represents amp hours as defined as throughput (total use of the battery by integrating battery current), $\Delta Ah$ represents a change in throughput, n is a calibration function, and $\Delta Q_{loss}$ represents an incremental battery capacity loss due to a current operation. It is contemplated that the supervisory processor can implement other equations to calculate the battery capacity loss or other battery SOH impact variables.

The supervisory processor 148 is programmed to determine an impact that the current operation has on cabin comfort, which can be defined by Equations 7, 8, and 9:

$$T_{cabin,error} = \Sigma(T_{cabin} - T_{cabin,target})^2 \qquad \text{Eq. 7}$$

$$EHT_{error} = \Sigma(EHT - EHT_{target})^2 \qquad \text{Eq. 8}$$

$$PMV \in (-0.5, 0.5) \text{comfort range} \qquad \text{Eq. 9}$$

where $T_{cabin}$ represents a current cabin temperature, $T_{cabin,target}$ represents the adjusted cabin temperature determined by the supervisory processor 148, $T_{cabin,error}$ represents an error in the cabin temperature between the current cabin temperature and the adjusted cabin temperature; EHT represents a nominal Equivalent Homogenous Temperature (an HVAC related variable to combine additional metrics, such as humidity, to quantify a temperature felt by passengers) and first determined by the local processor 108; $EHT_{target}$ represents an adjusted EHT set-point determined by the supervisory processor 148; $EHT_{error}$ represents an error in the Equivalent Homogenous Temperature between the measured EHT and the adjusted EHT; and PMV represents a Predicted Mean Vote or a Predicted Percentage Dissatisfied, which is an index that predicts an average climate assessed by the passenger. It is contemplated that the supervisory processor can implement other equations to calculate the error in the cabin temperature between the adjusted cabin temperature and the measured cabin temperature, an error in the EHT between the measured EHT and the nominal EHT, the PMV, or other cabin comfort variables.

The supervisory processor 148 is further programmed to augment or adjust a modulated load to produce a target output with a reduced battery SOH, e.g., by drawing the least amount of electrical energy from the RESS 104. The modulated load can be the HVAC subsystem 116, the thermal subsystem 126, or other suitable vehicle subsystems. The system 102 does not modulate the traction subsystem 136 so as to avoid sacrificing driver demand.

In one example, the supervisory processor 148 implements a physics-based model for augmenting the modulated load based on a preview of tractions states, e.g. obtained from V2V communications 170, V2X communications 172, and other network communications. Continuing with the previous example, the supervisory processor 148 can be programmed to augment the local HVAC processor 118 by establishing an adjusted heat input set-point $\overline{Q}_{cabin}$ within a fixed time window $T_w$, which can be defined by Equations 10 and 11:

$$Q_{cabin} = Q_{cabin,nom} + g^*(v_{speed} - v_{speedave,pre}) \qquad \text{Eq. 10}$$

$$\Sigma_{T\_w} Q_{cabin} = \Sigma_{T\_w} Q_{cabin,nominal} \text{ since}$$
$$\Sigma_{T\_w} v_{speed} = v_{speedave,pre} * T_w \qquad \text{Eq. 11}$$

where $\overline{Q}_{cabin,nom}$ represents the nominal reference cabin heat input set-point first determined by the local HVAC processor; g represents a calibration parameter to adjust the amount of adjustment by the supervisory processor 148, $v_{speed}$ represents a current vehicle speed; $v_{speeave,pre}$ represents an average vehicle speed over a future time window of length $T_w$ (preview window) and can be approximated with the sensors 160, V2V communications 170, V2X communications 172, or any other preview apparatus; and $\overline{Q}_{cabin}$ represents the adjusted cabin temperature set-point that the supervisory processor 148 determines for the local HVAC processor 118.

In another example, the supervisory processor 148 implements another physics-based model for augmenting the modulated load based on, for example, past statistics of the host vehicle or posted speed limits. More specifically, the supervisory processor can be programmed to augment the local HVAC processor 118 by establishing an adjusted heat input set-point $\overline{Q}_{cabin}$ within a variable time window $T_w$, which can be defined by Equations 12 and 13:

$$Q_{cabin} = Q_{cabin,nom} + g^*(v_{speed} - v_{cal}) \qquad \text{Eq. 12}$$

Adjust $T_w$ on the fly to achieve
$$\Sigma_{T\_w} g^*(v_{cal} - v_{speed}) = 0 \qquad \text{Eq. 13}$$

where $v_{cal}$ represents a calibrated average vehicle speed estimate (using past statistics, speed limits, and the like). Based on the law of averages and the calibrated average vehicle speed $v_{cal}$, the supervisory processor 148 implements Equations 12 and 13 in real-time to determine a period of time $T_w$ in which the adjusted heat input $Q_{cabin}$ is the same as the original cumulative heat input $Q_{cabin,nom}$ requested by the local HVAC processor 118.

For each of the exemplary modulated loads, the supervisory processor 148 increases the nominal set-point when the vehicle speed $v_{speed}$ is above an average vehicle speed $v_{speedave,pre}$ or $v_{cal}$, and the supervisory processor 148 decreases the nominal set-point when the vehicle speed $v_{speed}$ is below the average vehicle speed $v_{speedave,pre}$ or $V_{cal}$, such that more power is delivered to the component 114 when it is operating more efficiently. It is contemplated that the supervisory processor 148 can implement other equations to determine the adjusted cabin temperature set-point $T_{cabin}$, the adjusted heat input set-point $Q_{cabin}$, or other HVAC variables.

The supervisory processor 148 is further configured to implement a data-driven model for augmenting the modulated load. During a training mode in the design phase, the supervisory processor 148 implements Reinforcement Learning (RL) to build a lookup table or determine a control mapping V(S,U) through iterative learning with reward feedback. Later, during in-field use, the supervisory processor 148 employs the same structure to adapt learning control on-board and in real-time with the reward feedback.

Figure 2:
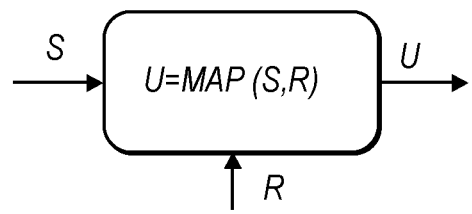
FIG. 2 is a block diagram of the system of FIG. 1.

Reinforcement Learning (RL) is a form of goal-directed machine learning. For example, an agent can learn from interaction with its environment without relying on explicit supervision and/or complete models of the environment. RL is a framework modeling the interaction between the learning agent and its environment in terms of states S, actions U, and rewards R. At each time step, an agent receives a state S, selects an action U based on a policy, receives a scalar reward, and transitions to the next state S'. The states S, S' can be based on one or more sensor inputs, e.g. sensors 160, V2V communications 170, VZX communications 172, indicative of the environmental data. The agent's goal is to maximize an expected cumulative reward R. The agent may receive a positive scalar reward for a positive action U and a negative scalar reward for a negative action U. Thus, the agent "learns" by attempting to maximize the expected cumulative reward R. While the agent is described within the context of a vehicle herein, it is understood that the agent may comprise any suitable reinforcement learning agent. Within the present context, the supervisory processor 148 can be referred to as an agent. While the present example of the supervisory processor 148 implements a multidimensional table, other examples of the supervisory computer 146 can be configured to implement a deep neural network-based reinforcement learning procedure Referring to FIG. 2, the supervisory processor 148 is further programmed to determine the control mapping V(S, U) and the learning rule by using Equations 14, 15, 16, and 17:

$$U = MAP(S, R) \quad \text{Eq. 14}$$

$$R = -(\Delta Q_{loss} + \alpha|\Delta T|) \quad \text{Eq. 15}$$

$$U = \pi^*(S) = \operatorname*{argmax}_u V^*(S, U) \quad \text{Eq. 16}$$

$$Vnew(S, U) \leftarrow [1-\alpha]V(S, U) + \alpha\left[R(S, U) + \gamma \max_{U'} V(S', U')\right] \quad \text{Eq. 17}$$

where S represents the states, such as the traction variables (e.g., $v_{speed}$, $v_{accel}$, $P_{trac}$ etc.) and nominal reference setpoints (e.g. $Q_{cabin,nom}$, $T_{cabin,nom}$, $P_{HVAC}$, etc.); U represents actions, such as adjusted set-points for the load augmentation variable (e.g., $T_{cabin}$ or $Q_{cabin}$); R represents the rewards, such as real-time feedback in the form of battery aging (e.g., capacity loss) and cabin comfort; $\Delta Q_{loss}$ represents the incremental change in battery capacity loss at the current operation; $\alpha|\Delta T|$ difference between target and actual cabin temperatures to capture cabin comfort;

$$\arg\max_u V^*(S, U)$$

indicates the operation of using the V(S,U) table in the control and picking an action U with the highest V(S,U) value in the table at the current measured state S; n*(S) indicates the Policy putting the operation into one representation; V(S,U) represents a current multidimensional table V(S,U) with the states S and actions U and outputs an action U that captures the value of a particular U at the state S; α is s learning rate; γ is a discount factor;

$$\alpha\left[R(S, U) + \gamma\max_{U'} V(S', U')\right]$$

represents a projected value from the current V table at the next S and U denoted by S' sand U'; and Vnew(S,U) represents an updated multidimensional table with states S and actions U.

Overall, the supervisory processor 148 uses Equations 14 through 17 to update the current V(S,U) table during learning based on its performance measured by the reward value R. In other words, the reward value R is a performance measure stored in the V(S,U) table. After the training phase, the final V(S,U) table is put into the embedded control and used to determine the action U. The same learning rule can also be further used in the control with a reduced learning rate to adapt V(S,U) slowly in real vehicle use against variations in the field.

More specifically, in operation, the supervisory processor 148 is further programmed to receive the state S from the traction subsystem 136 of the electric vehicle 100. The state S includes at least one of the traction power $P_{trac}$ to operate the traction subsystem 136, a nominal reference cabin heat input $Q_{cabin,nom}$ determined by the local HVAC processor 118, the base power input $P_{HVAC}$ associated with the nominal reference cabin heat input $Q_{cabin,nom}$, an acceleration of the electric vehicle 100, a current vehicle speed $V_{speed}$, an average vehicle speed $v_{speedave,pre}$, and a calibrated average vehicle speed estimate $v_{cal}$. One or more of these states can be based on data from at least one of the sensors 160, the V2V communications 170, and the V2X communications 172. The calibrated average vehicle speed estimate $v_{cal}$ is based on at least one of a past statistic for the electric vehicle and a speed limit.

The supervisory processor 148 is further programmed to: determine a value function V(S,U) based on a plurality of actions U at a plurality of states S. The supervisory processor 148 is further programmed to calculate a current reward value R based on a change of at least one a battery capacity loss $\Delta Q_{loss}$ and a cabin comfort $\alpha|\Delta T|$. In this example, the current reward value R can be incrementally increased, in response to a decrease in the change in battery capacity loss $\Delta Q_{loss}$ and/or a decrease in the difference between target and actual cabin temperatures $\alpha|\Delta T|$ at the current operation.

The supervisory processor 148 is further programmed to select an action U associated with the highest reward value U corresponding to the current state S and the value function V(S,U). In this example, the supervisory processor 148 generates the modulated power signal associated with the request to modulate between the first and second power inputs, in response to the supervisory processor 148 receiving the nominal signal from the local HVAC processor 118, and the local HVAC processor 118 modulates between the first and second power inputs, in response to the local HVAC processor 118 receiving the modulated signal from the supervisory processor 148.

The supervisory processor 148 is further programmed to actuate an agent based on the selected action. Continuing with the previous example, the agent can be the HVAC subsystem 116. The supervisory processor 148 does not control the traction subsystem, such that traction response is not changed by the system 102, and the system 102 does not consider velocity or torque shaping.

Figure 3:
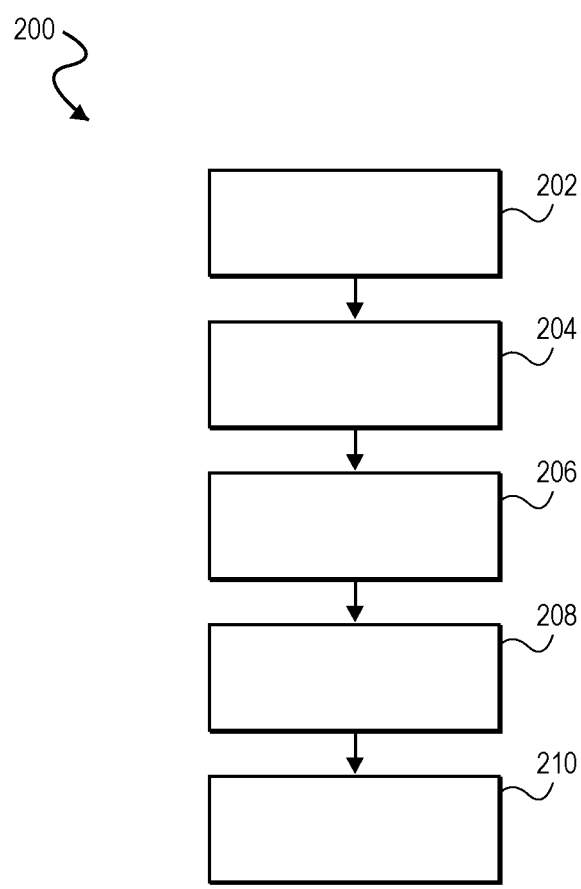
FIG. 3 is a flow chart of one example of a method of operating the system of FIG. 1.

Referring now to FIG. 3, one example of a method 200 is provided for operating the supervisory computer 146 for the energy management system 102 of the electric vehicle 100 illustrated in FIG. 1. The method 200 commences at block 202 with the supervisory processor 148 learning or determining the value function V(S,U) based on a plurality of actions U in a plurality of states S, during for example a training or design phase. In this example, the action U is an HVAC subsystem variable, and the states S include at least one of a power $P_{trac}$ drawn from a rechargeable energy storage system (RESS) to operate a traction subsystem, a current vehicle speed $v_{speed}$, an average vehicle speed $v_{speeave,pre}$, a calibrated average vehicle speed estimate $v_{cal}$, an acceleration of the electric vehicle, a nominal reference cabin heat input set-point $Q_{cabin,nom}$ determined by a local HVAC processor 118, and a power $P_{HVAC}$ drawn from the RESS to operate the HVAC subsystem 116,. During this learning phase, the multidimensional table V(S,U) is created with from initial values, e.g. empirically determined data, and tested with several profiles (e.g. states S for various drive cycles and HVAC operations) and at each time step, the states S evolve in time. The supervisory processor uses Equations 14 through 17 to determine the action U at the current state S.

At block 204, the supervisory processor 148 calculates at least one reward value R according to Equation 15, based on a change of at least one a battery capacity loss $\Delta Q_{loss}$ and a cabin comfort $\alpha |\Delta T|$. During the learning phase, the supervisory processor 148 measures the next state S', calculates the reward value R.

At block 206, the supervisory processor 148 calculates at least one updated value function Vnew(S,U) based on Equations 13 through 17. During the learning phase, the supervisory processor 148 updates the multidimensional table V(S,U) based on blocks 202 and 204 and the example learning rule. In this way, the multidimensional table V(S,U) is gradually updated such that the corresponding reward R from each possible action U is learned and supervisory processor 148 can choose the best action U with the highest reward R at a given state S. Once the test profiles are consumed during this learning step, the updated multidimensional table Vnew(S,U) is finalized and put into the final embedded processor.

At block 208, the supervisory processor 148 selects an action U corresponding to the value function V(S,U) having the highest reward value R. In these examples, the action U is an adjusted HVAC set-point sent from the supervisory processor 148 to the local processor 108 of any one or more subsystems managed by the system 102, such that the system 102 can modulate power supplied to the corresponding subsystem to reduce the overall power drawn from the RESS 104 while maintaining the same output by each subsystem.

During real-vehicle use, the pre-calibrated value function V(S,U) acts as a mapping from any state S (which is the input to the supervisory processor 148, e.g. current measurements) and the action U will be the output that is applied to the subsystem as the final control. In addition, the same learning rule is used to further adapt the value function V(S,U) with the actual reward value R that is obtained. This additional learning further adjusts the value function V(S, U), which acts as a real-time learning algorithm. Overall, this mechanism and the selection of reward R (which was capturing the battery aging and comfort cabin impact by design) enable that the map is optimal with respect to the reward R chosen.

Figure 4:
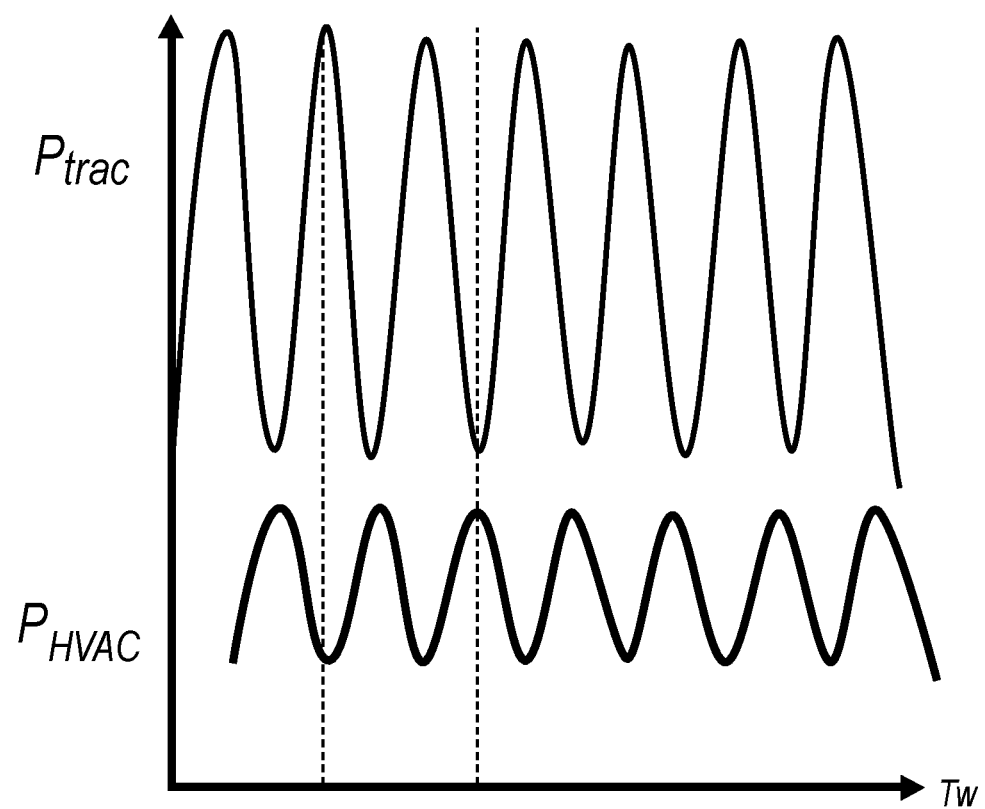
FIG. 4 is graph of an exemplary modulation of traction power and HVAC power.

Referring to FIG. 4, in specific use cases, the action U is an add-on to the nominal reference cabin temperature set-point $T_{cabin,nom}$ or nominal reference cabin heat input set-point $FQ_{cabin,nom}$. Considering one variable U in state S (e.g., current traction demand $P_{trac}$), the learned action U acts such that the supervisory processor 148 incrementally increases the cabin temperature set-point when the traction power $P_{trac}$ is above a predetermined threshold so that the required HVAC power is instantaneously below a mean HVAC power demand. Similarly, if there is sudden dip in traction power $P_{trac}$, the supervisory processor 148 incrementally decreases the cabin temperature set-point when the traction power $P_{trac}$ is below a predetermined threshold so that the required HVAC power $P_{HVAC}$ is instantaneously above a mean HVAC power demand $P_{HVAC}$. Because the adjustments to HVAC power demand $P_{HVAC}$ are incremental, the average temperature in the cabin remains generally unchanged. In addition, because the adjustments to HVAC power demand counteract changes to traction power $P_{trac}$, the battery current from the RESS 104 is attenuated or flattened.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, New York, the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA™, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A supervisory computer for an energy management system of an electric vehicle, the supervisory computer comprising:
   a supervisory processor; and
   a supervisory memory including instructions such that the supervisory processor is programmed to:
      determine a value function V based on a plurality of actions U in at a plurality of states S; and
      select an action corresponding to the value function V associated with a highest reward value at a current state S;
      wherein at least one of the actions U comprises an HVAC subsystem variable; and
      wherein at least one of the states S comprises at least one of a traction power drawn from a rechargeable energy storage system (RESS) to operate a traction subsystem, a base power input drawn from the RESS to operate an HVAC subsystem, a nominal reference cabin heat input set-point determined by a local HVAC processor, an acceleration of the electric vehicle, a current vehicle speed, an average vehicle speed, and a calibrated average vehicle speed estimate.

2. The supervisory computer of claim 1 wherein the supervisory processor is further programmed to:
   calculate a current reward value based on a change of at least one a battery capacity loss and a cabin comfort.

3. The supervisory computer of claim 2 wherein the average vehicle speed is based on at least one of V2V data and V2X data.

4. The supervisory computer of claim 3 wherein the calibrated average vehicle speed estimate is based on at least one of a past statistic for the electric vehicle and a speed limit.

5. The supervisory computer of claim 4 wherein the supervisory processor is further programmed to:
   actuate an agent based on the selected action.

6. The supervisory computer of claim 5 wherein the agent comprises the HVAC subsystem.

7. The supervisory computer of claim 6 wherein the supervisory processor is further programmed to receive one of the states S from a traction subsystem of the electric vehicle.

8. An energy management system for an electric vehicle, the system comprising:
- a rechargeable energy storage system (RESS);
- an HVAC subsystem comprising:
  - a local HVAC processor;
  - at least one HVAC memory including instructions executable by the local HVAC processor such that the local HVAC processor is programmed to generate a nominal signal associated with a request for a base power input from the RESS;
  - an HVAC actuator capable of generating a target output over a predetermined period of time in response to the HVAC actuator receiving the base power input from the RESS;
- a traction subsystem comprising:
  - a local traction processor;
  - at least one traction memory storing instructions executable by the local traction processor such that the local traction processor is programmed to generate a traction signal associated with a request for a traction power drawn from the RESS; and
- a supervisory computer comprising:
  - a supervisory processor; and
  - a supervisory memory including instructions such that the supervisory processor is programmed to:
    - determine a value function V based on a plurality of actions U in a plurality of states S; and
    - select an action associated with a highest reward value corresponding to the value function V;
    - wherein at least one of the actions U comprises an HVAC subsystem variable; and
    - wherein at least one of the states S comprises at least one of the traction power to operate the traction subsystem, the base power input to operate the HVAC subsystem, a nominal reference cabin heat input set-point determined by the local HVAC processor, an acceleration of the electric vehicle, a current vehicle speed, an average vehicle speed, and a calibrated average vehicle speed estimate.

9. The energy management system of claim 8 wherein the HVAC actuator is configured to actuate an HVAC component that is configured to:
- operate at a first efficiency to generate a first output in response to the electric vehicle being disposed in a first state and the HVAC component receiving a first power input from the RESS;
- operate at a second efficiency to generate a second output in response to the electric vehicle being disposed in a second state and the HVAC component receiving a second power input from the RESS; and
- generate the target output in response to the HVAC actuator receiving a modulation between the first and second power inputs over the predetermined period of time, and the second efficiency being above the first efficiency such that an electrical power associated with the modulation between the first and second power inputs over the predetermined period of time is below the electrical power associated with the base power input over the predetermined period of time.

10. The energy management system of claim 9 wherein the supervisory processor selecting the action associated with the highest reward value comprises the supervisory processor generating a modulated power signal in response to the supervisory processor receiving the nominal signal from the local HVAC processor, and the local HVAC processor modulating between the first and second power inputs in response to the local HVAC processor receiving the modulated signal from the supervisory processor.

11. The energy management system of claim 10 wherein the supervisory processor does not control the traction subsystem.

12. The energy management system of claim 11 wherein the supervisory processor is further programmed to:
- calculate a current reward value based on a change of at least one a battery capacity loss and a cabin comfort.

13. The energy management system of claim 12 wherein the average vehicle speed is based on at least one of V2V data and V2X data.

14. The energy management system of claim 13 wherein the calibrated average vehicle speed estimate is based on at least one of a past statistic for the electric vehicle and a speed limit.

15. The energy management system of claim 14 wherein the supervisory processor is further programmed to:
- actuate an agent based on the selected action.

16. The energy management system of claim 15 wherein the agent comprises the HVAC subsystem.

17. The energy management system of claim 16 wherein the supervisory processor is further programmed to receive one of the states S from the traction subsystem of the electric vehicle.

18. A method of operating a supervisory computer for an energy management system of an electric vehicle, with the supervisory computer including a supervisory processor and a supervisory memory, the method comprising:
- determining, using the supervisory processor, a value function V based on a plurality of actions U in a plurality of states S; and selecting, using the supervisory processor, an action associated with a highest reward value corresponding to the value function V;
- wherein the action U comprises an HVAC subsystem variable; and
- wherein the state S comprises at least one of a power drawn from a rechargeable energy storage system (RESS) to operate a traction subsystem, a power drawn from the RESS to operate an HVAC subsystem, a current vehicle speed, an acceleration of the electric vehicle, a nominal reference cabin heat input set-point determined by a local HVAC processor, an average vehicle speed, and a calibrated average vehicle speed estimate.

19. The method as recited in claim 18, further comprising:
- calculating, using the supervisory processor, a current reward value R based on a change of at least one a battery capacity loss and a cabin comfort.

20. The method of claim 19, wherein the supervisory processor determines the value function V based on a change of at least one a battery capacity loss and a cabin comfort according to:

$$U = \pi^*(S) = \underset{u}{\mathrm{argmax}}\, V^*(S, U)$$

wherein V(S,U) represents a current multidimensional table V(S,U) for control mapping and comprises a value function with the states S to provide a corresponding action U;

wherein $$\underset{u}{\operatorname{argmax}} V^*(S, U)$$

operation of selecting the action U associated with the highest reward value R at the state S from the current multidimensional table V(S,U); and wherein π*(S) is a policy putting the operation into one representation such that the supervisory processor selects the action U associated with the highest value function V at the current S in the current multidimensional table V(S,U) as a final action U; and $$Vnew(S, U) \leftarrow [1 - \alpha]V(S, U) + \alpha\left[R(S, U) + \gamma \underset{U'}{\max} V(S', U')\right]$$

wherein the current multidimensional table is updated to a new multidimensional table Vnew(S,U);

wherein the current multidimensional table V(S,U) is multiplied by [1−α] and added with a term summing a current reward value R and a projected value from the current multidimensional table V(S,U) based on a next action U' at a next state S';

wherein α is s learning rate and γ is a discount factor.

* * * * *